Dec. 15, 1936.  H. C. PARKER  2,064,492
AUTOMOBILE VENTILATOR AND WINDSHIELD DEFROSTER
Filed April 29, 1933
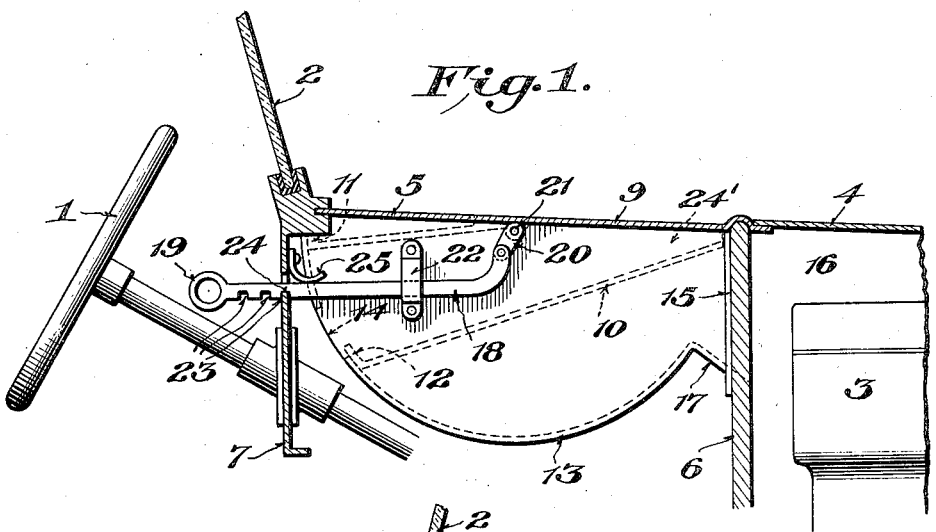
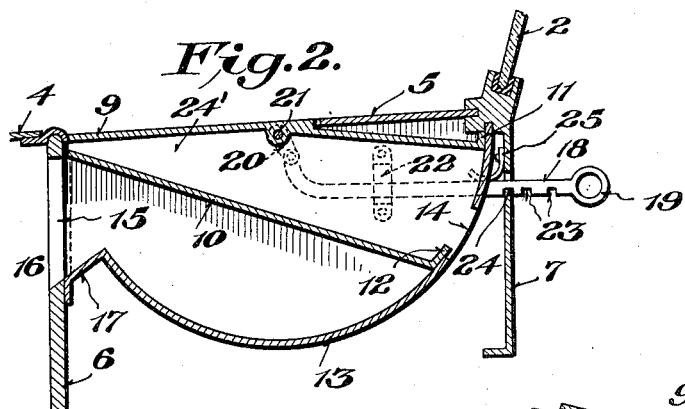
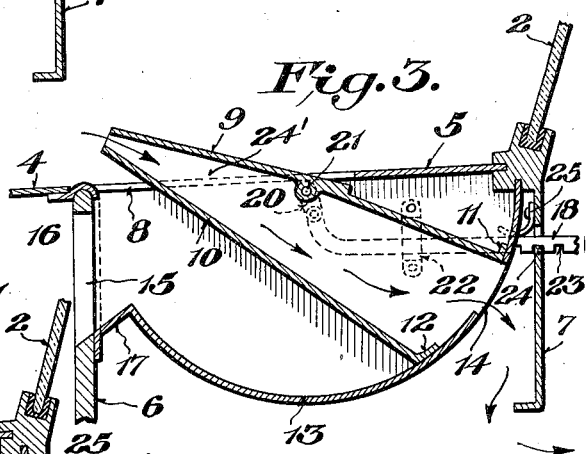
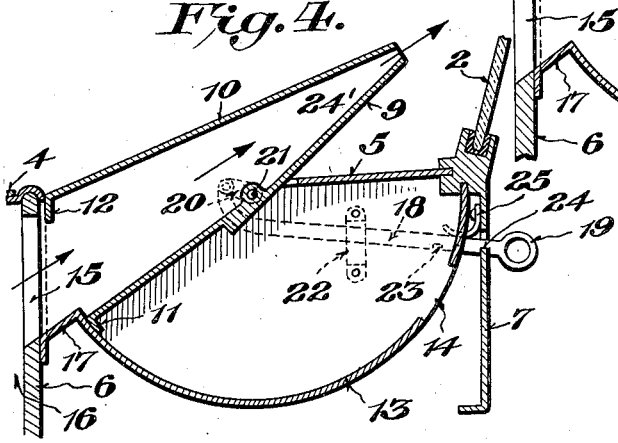
Inventor
Henry C. Parker Patented Dec. 15, 1936

2,064,492

UNITED STATES PATENT OFFICE 2,064,492

AUTOMOBILE VENTILATOR AND WIND-
SHIELD DEFROSTER

Henry C. Parker, Washington, D. C.

Application April 29, 1933, Serial No. 668,644

8 Claims. (Cl. 20—40.5)

This invention relates to automobile ventilators and windshield defrosters; and it comprises an automobile attachment suitable to serve either as cowl ventilator or as a windshield defroster according to the setting of a valve element which serves as an air duct; said valve element comprising two spaced sheets of metal pivotally mounted in an opening in the cowl of the automobile to rotate through an angle greater than 90 degrees; the said metal sheets, when in one position, cooperating with a valve chamber beneath the cowl to serve as means for directing cool air into the car and, when in another position, serving as means to direct warm air, usually from the engine compartment of the car, against the front of the windshield; all as more fully hereinafter set forth and as claimed.

A large number of automobiles are now equipped with cowl ventilators. These devices have proved to be simple and easy to manipulate. They provide a highly effective method of cooling a car in warm weather. Most cars are not as satisfactorily equipped for winter driving. More specifically they are not provided with appliances designed to cope with snow, sleet and ice storms. Driving during such storms is highly dangerous due to the poor visibility caused by the collection of snow and/or ice upon the windshield.

While numerous devices have been described in the patent literature which provide methods for heating the windshield, very few of these have been placed on the market. To my knowledge no cars now come from the factory equipped with such appliances. Most of the devices of the prior art have had the single function of directing a stream of hot air from the engine compartment or from a collector around the exhaust manifold against the outside or inside of the windshield. A few have been provided with two or more of the functions of (1) heating the windshield (2) heating the car and (3) ventilating the car. Such devices, for example, are shown in U. S. Patents Nos. 1,837,773; 1,851,619; 1,892,078 and 1,892,847.

The present invention represents an improvement over such devices as provide car ventilation and windshield heating. It provides an extremely simple and easily operated device designed to provide car ventilation in one position and windshield heating in another position. In appearance and operation my invention is much like the usual cowl ventilator. In effect my device comprises the usual cowl ventilator provided, at no great additional expense, with the added function of heating the windshield.

My invention can be explained more readily by reference to the accompanying drawing which shows, more or less diagrammatically, an advantageous embodiment thereof.

In this showing:

Fig. 1 is a vertical section through the cowl of an automobile showing my device in elevation from the right hand side of the automobile.

Fig. 2 is a vertical section through my device in its normal or closed position taken from the left hand side.

Fig. 3 is a vertical section from the left hand side showing the valve in its partially open or ventilating position; while Fig. 4 is a vertical section from the left hand side showing the valve fully open and in position for heating the windshield.

In the various figures like parts are indicated by like reference numerals.

Referring especially to Fig. 1, elements 1, 2, 3, 4 and 5 are the conventional steering wheel, windshield, engine, hood and cowl of an automobile, respectively. The dashboard and instrument panel are indicated by numerals 6 and 7, respectively. An opening 8 (Fig. 3) in the cowl is provided, in which there is pivoted the valve element or member 24' comprising sheet metal vanes 9 and 10; the forward or upper portion of the vane 9 serving as a cover for the opening 8 when the device is in its normal or closed position. These vanes are held apart in fixed position, usually by side walls. The vanes may be tapered as shown or they may be substantially parallel. At their rearward or lower ends the vanes are provided with angular pieces or extensions 11 and 12 which bear with a sliding fit against the inner wall of valve chamber 13. The valve chamber is essentially a hemi-cylindrical chamber closed at both ends and provided with two openings. One of these openings 14 leads from the valve chamber into the car just beneath the instrument panel 7. The other opening 15 leads from the engine compartment 16 into the valve chamber, through a short conduit 17. This conduit 17 may, of course, be connected with a pipe leading to a hot air collector positioned around the exhaust manifold of the engine, in well known manner. Usually, however, the engine compartment of the car furnishes air sufficiently warm for all purposes. The radiator fan supplies this air under considerable pressure.

In order to operate or to tilt the valve member 24', I have provided an operating lever or rod 18, shown best in Fig. 1. This lever is advantageously curved slightly at its forward end and is provided with a loop or knob 19 which serves as an operating handle. The lever 18 is usually positioned to one side of the valve chamber 13. Its curved end may be attached pivotally to a short crank 20, which in turn may be secured in fixed position to the rod 21 forming the pivoting element of the valve member 24'. A bracket 22 is usually provided, serving as a guide for the operating lever. Notches 23 are provided at the lower edge of the operating lever. These notches engage with a tooth 24 in the instrument panel to hold the valve member 24' in any desired position.

It is possible to mount the operating lever 8 inside the valve chamber, the lower end of vane 9 and the wall of the valve chamber being slotted to receive the lever. Such a slot permits a slight leakage of warm air into the car when the device is in its windshield heating position. Such leakage is, of course, not objectionable.

The operation of my ventilating and windshield heating device is believed to be clear from the various figures of the drawing. In its closed position, shown in Fig. 2, the device acts neither as a ventilator nor as a windshield heater. The vane 10 acts as a valve to prevent the warm air from the engine compartment entering the car through the opening 14. In its ventilating position, shown in Fig. 3, cool air enters the foretion ward end of the valve element 24 which is raised above the cowl. As shown by the arrows in Fig. 3, the air passes through the air duct formed between the vanes 9 and 10 and enters the car through the opening 14. This opening registers with the opening between the angular extensions 11 and 12 of the vanes. To open the device to its ventilating position (Fig. 3) it is only necessary to slightly raise the operating lever 18 against the pressure of the spring 25 and to push the lever foreward until the tooth 24 engages with the second of the notches 23.

In order to operate my device as a windshield heater, the lever 18 is pushed foreward until the tooth 24 engages with the third of the notches 23. This operation tilts the valve member 24' over backwardly until its upper end faces the windshield, while its lower opening registers with the opening 15. Warm air derived from the engine; that is either from the engine compartment itself or from a collector around the exhaust manifold; enters opening 15, as shown by the arrows in Fig. 4, passes between the vanes 9 and 10 and impinges against the windshield. With the modern stream lined windshield, this warm air passes upwardly over the face of the windshield and over the top of the car, thus forming a blanket of warm air between the windshield and the cold outside air. This warm air is sufficient to keep the windshield above freezing temperatures and to melt any snow or ice which may have formed thereon. The conventional windshield wiper can be employed to wipe off any melted ice or snow.

It is clear from the drawing that my valve member 24 rotates through an angle greater than 90 degrees but less than 180 degrees. When in its windshield heating position the vane 10, forming the top of the device, slopes from a point near the windshield downwardly, in a manner forming least obstruction to vision and least air resistance. It is usually advantageous to so space the vanes 9 and 10 that they form a tapered air duct, since in this form the device fits closer to the cowl.

My device has several advantages which are clearly apparent from the construction shown in the figures. Its simplicity and ease of operation are probably its outstanding characteristics. The device can be readily adapted to fit any of the cars now on the market and can even be sold as an accessory. The device is attractive and, in appearance, resembles the usual cowl ventilator, unless it is in its windshield heating position. Since windshield heating is required in rather rare instances it is important that a device suited for this purpose be rather inconspicuous. My device can be manufactured at a cost only slightly exceeding that of the usual cowl ventilator.

Various modifications can be made in my device without departing from the scope of the present invention. A single device may be used extending for some distance across the cowl or the device may be made of about the same size as the usual cowl ventilator with two or more being employed in different positions transversely across the cowl. While being particularly adapted for mounting on the cowl of an automobile, my device may also be mounted on the hood. Such a mounting necessitates certain changes in the design of the valve chamber which changes are believed clearly within the skill of the art. Different methods of operating my device may be employed. It may be opened continuously rather than in steps as shown, for example, by use of an operating lever provided with a screw thread cooperating with a threaded hand wheel. Different tapers can be employed for the air duct formed between the vanes 9 and 10, or these vanes may be substantially parallel. A drain may be provided for the valve chamber to discharge any water which may happen to collect therein. Warm air collecting devices may be employed to deflect air from the engine compartment or from around the exhaust manifold into the valve chamber. Other modifications which fall within the scope of the following claims will be evident to those skilled in the art.

What I claim is:

1. In an automobile having an engine, a source of warm air derived from said engine, a cowl and a windshield; an opening in said cowl, means pivotally mounted in and normally closing said opening capable of being tilted about a transverse, horizontal axis through an angle greater than 90 degrees and serving in one position to deflect cool air into said automobile and in another position to deflect warm air from said source against said windshield.

2. A valve element for an automobile ventilating and windshield heating device comprising two vanes spaced a fixed distance apart mounted to rotate about a single transverse axis and forming an air duct adapted to direct cool air into said automobile when in one position and to direct warm air against the windshield when in another position.

3. The valve element of claim 2 wherein the said spaced vanes are mounted to rotate through an angle greater than 90 degrees.

4. The valve element of claim 2 wherein said spaced vanes are also adapted to serve as a closure for a cowl opening when in a third position.

5. In an automobile having an engine compartment, a cowl and a windshield; an opening in said cowl, a hemi-cylindrical valve chamber mounted beneath said opening, a conduit leading from said engine compartment into said valve chamber, an opening leading from said valve chamber into said automobile, vanes spaced a fixed distance apart mounted upon a single axis in said valve chamber and adapted to direct heated air from said engine compartment against said windshield when in one position, and rotatable to another position to collect cool air from above said cowl opening and direct it into said automobile.

6. The device of claim 5 wherein said spaced vanes are mounted to rotate through an angle greater than 90 degrees.

7. The device of claim 5 wherein one of said vanes provides a closure for said cowl opening when said vanes are in their normal or third position.

8. A valve element for an automobile ventilating and windshield heating device comprising two vanes spaced a fixed distance apart mounted parallel to and rotatable about a single transverse, substantially horizontal axis and forming an air duct adapted to direct cool air into said automobile when in one position, to direct warm air against the windshield when in another position and to provide neither ventilating nor cooling when in a third position; one of said vanes being adapted to close a cowl opening when in said third position.

HENRY C. PARKER.